(12) United States Patent
Ishii et al.

(10) Patent No.: US 9,090,179 B2
(45) Date of Patent: Jul. 28, 2015

(54) VEHICLE SEAT RECLINING DEVICE

(71) Applicant: ANSEI CORPORATION, Obu-shi (JP)

(72) Inventors: Koji Ishii, Nagoya (JP); Satoshi Umezu, Nagoya (JP)

(73) Assignee: ANSEI CORPORATION, Obu-Shi (JP)

( * ) Notice: Subject to any disclaimer, the term of this patent is extended or adjusted under 35 U.S.C. 154(b) by 134 days.

(21) Appl. No.: 14/034,524

(22) Filed: Sep. 23, 2013

(65) Prior Publication Data

US 2014/0091591 A1     Apr. 3, 2014

(30) Foreign Application Priority Data

Sep. 28, 2012   (JP) ................................. 2012-217976

(51) Int. Cl.
*B60N 2/015* (2006.01)
*B60N 2/22* (2006.01)

(52) U.S. Cl.
CPC ............ *B60N 2/0155* (2013.01); *B60N 2/2245* (2013.01)

(58) Field of Classification Search
CPC .................................................... B60N 2/2245
USPC ............ 296/65.09, 65.16, 65.17; 297/378.13
See application file for complete search history.

(56) References Cited

U.S. PATENT DOCUMENTS

| | | | |
|---|---|---|---|
| 2,860,905 A | 11/1958 | Wiese | |
| 6,312,055 B1 | 11/2001 | Uematsu | |
| 7,377,584 B2 | 5/2008 | Griswold et al. | |
| 7,484,807 B2 * | 2/2009 | Okazaki et al. | 297/378.13 |
| 7,641,282 B2 | 1/2010 | Hinata et al. | |
| 8,146,996 B2 | 4/2012 | Vedder et al. | |
| 8,251,430 B2 | 8/2012 | Ishii et al. | |
| 8,439,446 B2 | 5/2013 | Ishii et al. | |
| 8,506,014 B2 * | 8/2013 | Bruck | 297/378.13 |
| 2008/0088167 A1 | 4/2008 | Okazaki et al. | |
| 2008/0129017 A1 | 6/2008 | Okazaki et al. | |
| 2011/0187171 A1 | 8/2011 | Ishii et al. | |
| 2011/0233981 A1 | 9/2011 | Ishii et al. | |

FOREIGN PATENT DOCUMENTS

| | | |
|---|---|---|
| JP | 2003312329 A | 11/2003 |
| JP | 2008094227 A | 4/2008 |

\* cited by examiner

*Primary Examiner* — H Gutman
(74) *Attorney, Agent, or Firm* — J-TEK Law PLLC; Jeffrey D. Tekanic; Scott T. Wakeman

(57) ABSTRACT

A latch mechanism of a vehicle seat reclining device includes a plurality of latch holes formed in a rail along a central axial line, a slider hole penetrating through a slider so as to face the respective latch holes, a support portion provided on the slider, and a movable portion displaceably supported by the support portion and having a latch projection that is engageable with the respective latch holes while passing through the slider hole. A clearance is defined in the direction of the central axial line between the slider hole and the latch projection. One or more shock absorbing members is (are) provided on opposing first and second inner surfaces of the slider hole and abut against the latch projection while being resiliently deformed to suppress the generation of undesirable rattling noise in case a force causes the latch projection to oscillate within the engaged latch hole.

20 Claims, 12 Drawing Sheets

VEHICLE SEAT RECLINING DEVICE

CROSS-REFERENCE

This application claims the priority benefit of Japanese Patent Application No. 2012-217976 filed on Sep. 28, 2012, the entire contents of which are incorporated by reference as if fully set forth herein.

TECHNICAL FIELD

The present invention relates to a vehicle seat reclining device.

BACKGROUND ART

Japanese Laid-open Patent Publication No. 2003-312329A discloses a vehicle seat reclining device that includes a portion affixed to the side of a vehicle body. The vehicle seat reclining device cooperates with a locking device, which is affixed to the tiltable backrest of a vehicle seat, so as to permit the backrest to be selectively locked in a stepwise manner in a series of tilted positions.

The known vehicle seat reclining device includes a rail, a slider, and a latch mechanism. The rail extends along a central axial line. The rail is affixed to the side of the vehicle body so as to be tangential to a path traced in space by the locking device as the backrest tilts. The slider is slidably attached to the rail, and includes a striker configured to engage with the locking device. The latch mechanism is provided between the rail and the slider, and prevents or allows the slider to slide along the rail.

More specifically, the latch mechanism includes a plurality of latch holes formed in the rail and aligned along the central axial line, a slider hole that penetrates through the slider so as to face and be alignable with each of the respective latch holes, a support portion provided on the slider, and a movable portion displaceably supported by the support portion. The movable portion includes a latch projection that is engageable with each of the respective latch holes by passing through the slider hole. A clearance in the direction of the central axial line is provided between the latch projection and each side of the slider hole. Due to this clearance, the latch projection can easily slide within the slider hole, so that the latch projection can smoothly engage in each of the respective latch holes.

In the known vehicle seat reclining device having the above-described configuration, the latch mechanism can be operated so as to disengage the latch projection from the respective latch holes, thereby enabling a change of the tilted position of the backrest by sliding the slider along the rail. The backrest can then be fixed at a desired tilted position by engaging the latch projection with the corresponding latch hole.

SUMMARY OF THE INVENTION

As was mentioned above, a clearance in the direction of the central axial line is provided between the latch projection and each side of the slider hole in the above-described known vehicle seat reclining device. Therefore, when a force acts on the slider due to vibrations, etc. caused by movement of vehicle, the slider reciprocally shakes or oscillates relative to the rail in the direction of the central axial line. As a result, the slider hole and the latch projection repeatedly collide against each other in the direction of the central axial line, and generate an undesirable rattling noise.

In order to suppress or minimize the generation of such undesirable noise, the size of the clearance between the slider hole and the latch projection could be reduced. However, in this case, the likelihood increases that the latch projection will be caught on, or blocked by, the slider hole when it is intended to slide the latch projection relative to the slider hole in order to engage a latch hole. Therefore, a smooth engagement (movement) of the latch projection in (into) the respective latch holes may be impaired.

In addition, a dimensional tolerance control during manufacturing of the clearance between the slider hole and the latch projection may be time-consuming and/or labor-intensive, which may result in a sharp increase in production costs.

In view of these circumstances, it is an object of the present teachings to provide a vehicle seat reclining device which is capable of realizing a smooth engagement of a latch projection in the respective latch holes at a relatively low cost while suppressing the generation of undesirable noise caused by the latch projection contacting (rattling against) the sides of the slider hole.

In one aspect of the present teachings, a vehicle seat reclining device is configured to be affixable to a side of a vehicle body in order to fix a backrest in a series of tilted positions in a stepwise manner by cooperating with a locking device affixed to the tiltable backrest of a vehicle seat. The vehicle seat reclining device preferably includes one or more of: a rail extending along a central axial line and affixable to the lateral side of the vehicle body so as to align, overlap or intersect with a path, e.g., a curved path, that the locking device will trace in space as the backrest tilts (e.g., the central axial line is preferably at least substantially tangential to the curved movement path of the locking device);

a slider slidably provided on or in the rail and preferably including a striker configured to engage with the locking device affixed to the backrest; and a latch mechanism provided between the rail and the slider so as to selectively prevent and permit sliding of the slider relative to the rail.

The latch mechanism preferably includes a plurality of latch holes formed in the rail and aligned along the central axial line, a slider hole penetrating through the slider so as to face and/or be alignable with the respective latch holes, a support portion provided on the slider, and a movable portion displaceably supported by the support portion and having a latch projection that is engageable with the respective latch holes while passing through the slider hole.

In addition, a space or clearance is provided between the slider hole and the latch projection in a direction parallel to the central axial line.

Furthermore, one or more shock absorbing members is (are) preferably disposed on first and second inner surfaces of the slider hole, which first and second inner surfaces oppose each other in the direction of the central axial line. The shock absorbing member(s) is (are) resiliently deformed by, and in sliding contact with, the latch projection.

In such a vehicle seat reclining device, the space or clearance in the direction of the central axial line is filled by the shock absorbing member(s) disposed between the opposing sides of the slider hole and the latch projection. Therefore, in such a vehicle seat reclining device, even when a force acts on the slider due to vibrations, etc. during movement of the vehicle, which force causes or urges the slider to shake or reciprocally move (oscillate) relative to the rail in the direction of the central axial line, the latch projection does not repeatedly collide against the sides of the slider hole because the resiliently deformed shock absorbing member is sandwiched (interposed) therebetween in the direction of the central axial line. Consequently, in such a vehicle seat reclining device, it is possible to suppress or minimize the generation of undesirable (rattling) noise between the slider hole and the latch projection.

In such a vehicle seat reclining device, the space or clearance between the opposing sides of the slider hole and the latch projection may be increased (as compared to known designs) due to the advantages and effects provided by the shock absorbing member(s). Therefore, in such a vehicle seat reclining device, even if the dimensional tolerance control during manufacturing of the clearance between the slider hole and the latch projection is simplified or made less strict, the latch projection is still unlikely to be caught on, or blocked by, the slider hole when it is intended to slide the latch projection relative to the slider hole in order to engage one of the latch holes.

Therefore, in such a vehicle seat reclining device, it is possible to suppress or minimize the generation of undesirable (rattling) noise between the slider hole and the latch projection. In addition or in the alternative, it is possible to achieve a smooth engagement of the latch projection in the respective latch holes at a relatively low cost.

Preferably, a first amount of space (clearance or play) is provided in the direction of the central axial line between the movable portion and an end of the support portion on the one side in the direction of the central axial line. Preferably, a second amount of space (clearance or play) is provided in the direction of the central axial line between the movable portion and an end of the support portion on the other side in the direction of the central axial line. The first and second amounts of space preferably have lengths that do not become zero even when the shock absorbing member (or when one of the shock absorbing members) has been fully resiliently deformed between the latch projection and the first inner surface of the slider hole or between the latch projection and the second inner surface of the slider hole.

In addition or in the alternative, the latch projection and each latch hole are preferably engageable by abutment of the latch projection on both opposing sides of the latch hole in the direction of the central axial line. In this case, when a force urges the slider to move relative to the rail toward the one side or the other side in the direction of the central axial line while the latch projection is engaged in one of the latch holes, the force is transmitted between the slider and the rail via the first or second inner surface of the slider hole, the resiliently deformed shock absorbing member, the latch projection, and the latch hole. Consequently, the first and second amounts of space provided between the support portion and the movable portion do not become zero even when the shock absorbing member (or when one of the shock absorbing members) has been fully resiliently deformed between the latch projection and the first or second inner surface of the slider hole. Accordingly, the transmission of the force between the slider and the rail does not involve or pass through the support portion or the movable portion. Therefore, the structural strength or rigidity of the support portion may be reduced as compared to known designs, which has the advantage of reducing the production costs (and possibly the weight) of the vehicle seat reclining device.

In addition or in the alternative, a first inner surface on one side of the latch hole in the direction of the central axial line and a second inner surface of the latch hole on the other side in the direction of the central axial line may preferably extend in parallel to the direction in which the latch holes penetrate through the rail. A first distance is defined between the first and second inner surfaces of the latch hole. The first and second inner surfaces of the slider hole preferably may extend in parallel to the direction in which the slider hole penetrates through the slider. A second distance, which is preferably larger than the first distance, is defined between the first and second inner surfaces of the slider hole. Furthermore, the latch projection preferably includes a base portion, an intermediate portion, and a tip end portion sequentially from the base side to the tip end side thereof. A first outer surface on one side of the tip end portion in the direction of the central axial line and a second outer surface on the other side of the tip end portion in the direction of the central axial line preferably extend in parallel to the direction in which the latch holes penetrate through the rail. In addition, a third distance, which is preferably less than the first distance, is defined between the first and second outer surfaces of the tip end portion. A first outer surface on one side of the base portion in the direction of the central axial line and a second outer surface on the other side of the base portion in the direction of the central axial line preferably extend in parallel to the direction in which the slider hole penetrates through the slider. A fourth distance, which is preferably larger than the first distance but less than the second distance, is defined between the first and second outer surfaces of the base portion. The intermediate portion preferably continues from the first outer surface of the tip end portion to the first outer surface of the base portion and continues from the second outer surface of the tip end portion to the second outer surface of the base portion. The intermediate portion preferably has a shape that tapers or narrows in the direction from the base side to the tip end side.

In such an embodiment, the first inner surface of the latch hole and the first outer surface of the tip end portion, or the second inner surface of the latch hole and the second outer surface of the tip end portion, preferably come into abutment with each other in a parallel state. Also, the first inner surface of the slider hole and the outer surface of the base portion, or the second inner surface of the slider hole and the second outer surface of the base portion, preferably come into abutment with each other in a parallel state with the shock absorbing member interposed therebetween. Therefore, force is reliably transmitted between the slider and the rail via the first or second inner surface of the slider hole, the resiliently deformed shock absorbing member, the first or second outer surface of the base portion, the intermediate portion, the first or second outer surface of the tip end portion, and the first or second inner surface of the latch hole.

Furthermore, in an embodiment in which the intermediate portion preferably tapers or narrows in the direction from the base side to the tip end side, the tapered portion can dig or firmly fit into the engaged latch hole, such that the latch projection reliably abuts on both sides of the engaged latch hole in the direction of the central axial line. Therefore, it is possible to eliminate rattling of the latch projection between the sides of the engaged latch hole that face (contact) the latch projection. Consequently, in such a vehicle seat reclining device, it is possible to suppress or minimize the generation of undesirable rattling noise between the latch projection and the engaged latch hole.

In addition or in the alternative, the shock absorbing member(s) is (are) preferably formed from or comprised of spring steel. In this case, the durability of the shock absorbing member can be improved or increased as compared to a shock absorbing member formed from a soft material such as rubber or a resin.

In addition or in the alternative, the shock absorbing member(s) preferably include(s) a surrounding portion affixed to the slider and surrounding the slider hole, as well as a pair of resilient portions that bend from the surrounding portion and respectively protrude between the latch projection and the first and second inner surfaces of the slider hole. In such a case, production costs may be reduced for the vehicle seat reclining device, since the shock absorbing member can be easily manufactured from a thin-plate shaped, or a linear shaped, spring steel.

Preferably, in such an embodiment, each of resilient portions extends orthogonally to the direction of the central axial line and also in a direction orthogonal to the direction, in which the slider hole penetrates through the slider; they continue to the surrounding portion at both ends thereof, and inwardly curve or bend so that an intermediate portion of each resilient portion approaches the latch projection, i.e. the intermediate portion of each resilient portion is closer to the latch projection than the ends of the resilient portion. If the resilient portion has such a shape, it can easily and advantageously undergo nonlinear resilient deformation. Therefore, the characteristics/properties of the resilient portion(s) may easily be set in such a manner that a pressing force against the latch projection is relatively weak initially, but it increases abruptly or sharply (i.e. non-linearly) as the deformation progresses.

In addition or in the alternative, the support portion and the surrounding portion are preferably joined or affixed to the slider. In this case, it is possible to simplify the assembly steps of the vehicle seat reclining device as compared to an embodiment, in which the support portion and the surrounding portion are separately mounted on the slider.

In summary, in the vehicle seat reclining device of exemplary embodiments of the present teachings, generation of undesirable (rattling) noise between the slider hole and the latch projection may be advantageously suppressed. In addition or in the alternative, a smooth engagement of the latch projection in the respective latch holes may be advantageously achieved at a relatively low cost.

DETAILED DESCRIPTION OF EXEMPLARY EMBODIMENTS

Figure 1:
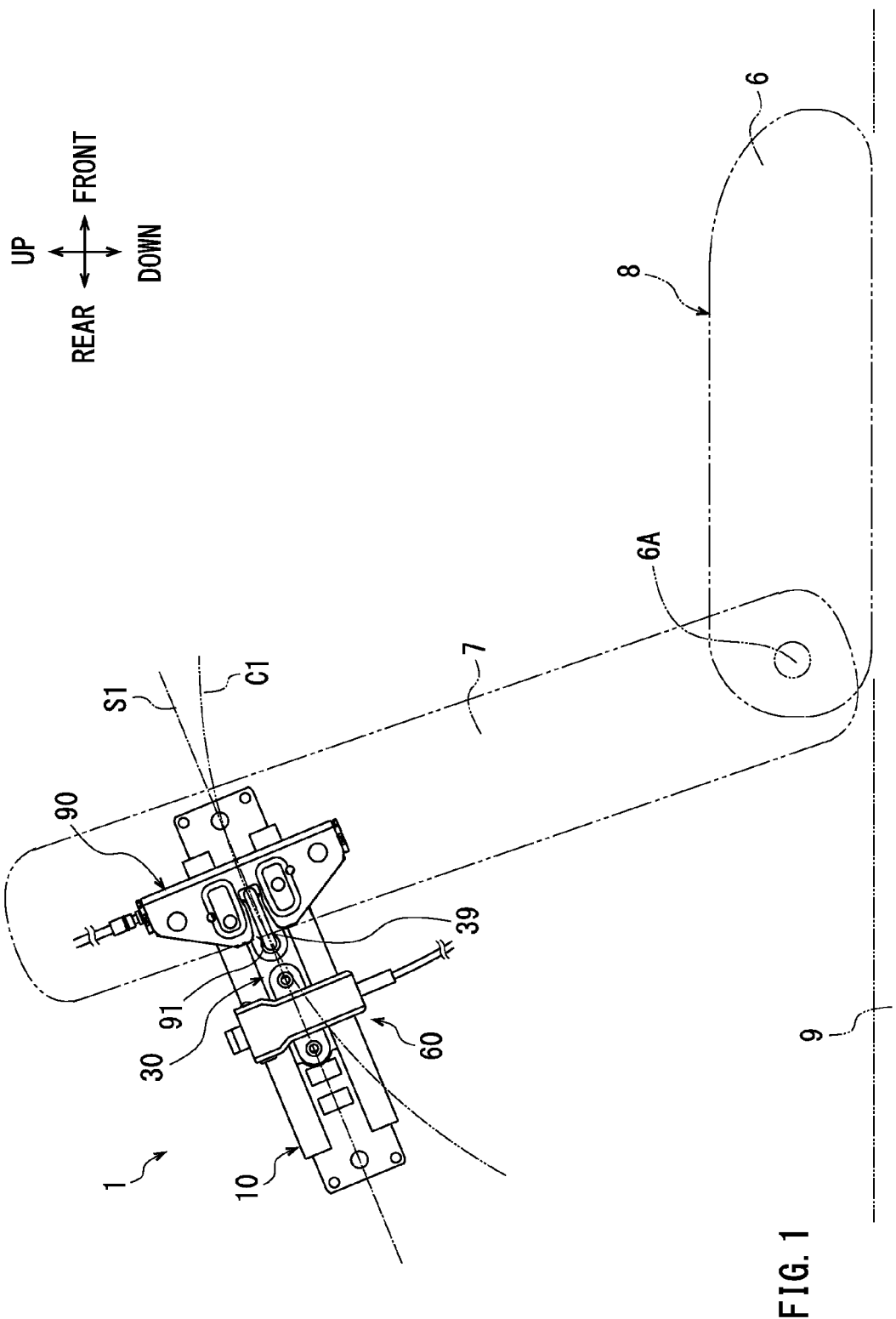
FIG. 1 is a schematic side view of a vehicle seat reclining device of an exemplary embodiment of the present teachings, illustrating the relative positional relationships of a backrest, a locking device, and a seat reclining device.

Referring now to the drawings, an embodiment in which the invention is embodied will be described. In FIG. 1, the right side of the drawing sheet is defined as the front side of the vehicle, the left side of the drawing sheet is defined as the rear side of the vehicle, the near side of the drawing sheet is defined as the right side of the vehicle, and the far side of the drawing sheet is defined as the left side of the vehicle. The lateral direction, the fore-and-aft direction, and the vertical direction of the respective drawings from FIG. 2 onward are all indicated so as to correspond to FIG. 1.

Embodiments

As illustrated in FIG. 1, a vehicle seat reclining device 1 of one exemplary embodiment of the present teachings may be utilized with a vehicle seat 8 mounted on a floor of a vehicle body 9 together with a locking device 90 mounted on a lateral side of a vehicle seat backrest 7. The vehicle seat 8 includes a seat main body 6, on which a passenger sits, and the backrest 7, against which the passenger leans. The backrest 7 is tiltably supported on a support shaft 6A provided at a rearward end portion of the seat main body 6 and rises up from the rearward end portion of the seat main body 6 in an oblique, rearward direction when in its normal operating position.

The locking device 90 is affixed to a generally upper portion of the left-side surface of the backrest 7, i.e. on the far side of the backrest 7 in FIG. 1, such that the backrest 7 is actually disposed between the viewer and the locking device 90. The locking device 90 may have a known configuration including a recessed opening 91 and a fork (not shown) that is displaceable to close the recessed opening 91. When the fork closes the recessed opening 91 with a striker 39 of the vehicle seat reclining device 1 inserted into the recessed opening 91, the locking device 90 engages with the striker 39 to fix the tilted position of the backrest 7. Further, the striker 39 is displaceable in a stepwise manner in the forward and rearward directions, which displacement is transmitted to the backrest 7 via the locking device 90 so as to change the tilted position of the backrest 7 in a stepwise manner. When the backrest 7 tilts, the locking device 90 traces a curved or arched path C1 in space and the center of the generally circular path C1 is the support shaft 6A.

While not shown in the drawings, a release lever for releasing the engagement between the locking device 90 and the striker 39 is provided in the vicinity of the vehicle seat 8. The release lever may be used, for instance, when the backrest 7 is to be folded forward in order to load a large piece of luggage behind the backrest 7. In this case, when the passenger operates the release lever, the locking device 90 will disengage from the striker 39, so that the backrest 7 can be folded (pivoted) forward about the support shaft 6A.

The vehicle seat reclining device 1 is provided on the left-hand side (on the far side of the locking device 90 in FIG. 1) of the locking device 90 and is attached to the lateral side of the vehicle body 9. The vehicle seat reclining device 1 includes a rail 10, a slider 30, and a latch mechanism 60.

As shown in more detail in FIGS. 2 to 5, the rail 10 may be formed by bending a metallic steel plate to substantially have a "C" shape in cross-section and to linearly extend along a central axial line S1. As shown in FIG. 6 (a cross-section along line A-A in FIG. 5), among inner wall surfaces of the rail 10, a bottom surface that extends in parallel with the central axial line S1 and extends in vertical (up-down) direction serves as a first guide surface 11. Similarly, a pair of surfaces that each extend at a right angle from the respective end edges of the first guide surface 11 in the width (up-down) direction (the horizontal direction in FIG. 6) and extend in parallel with the central axial line S1 serve as second guide surfaces 12A, 12B. Further, a pair of surfaces that each extend inwardly in the width (up-down) direction from the respective end edges of the second guide surfaces 12A, 12B serve as third guide surfaces 13A, 13B. The third guide surfaces 13A, 13B are spaced from the first guide surface 11 so as to extend in parallel with the first guide surface 11. If the rail 10 has such a cross-sectional shape, it is easy to increase the bend or flexural strength of the rail 10 while limiting or minimizing the height of the rail 10.

Figure 2:
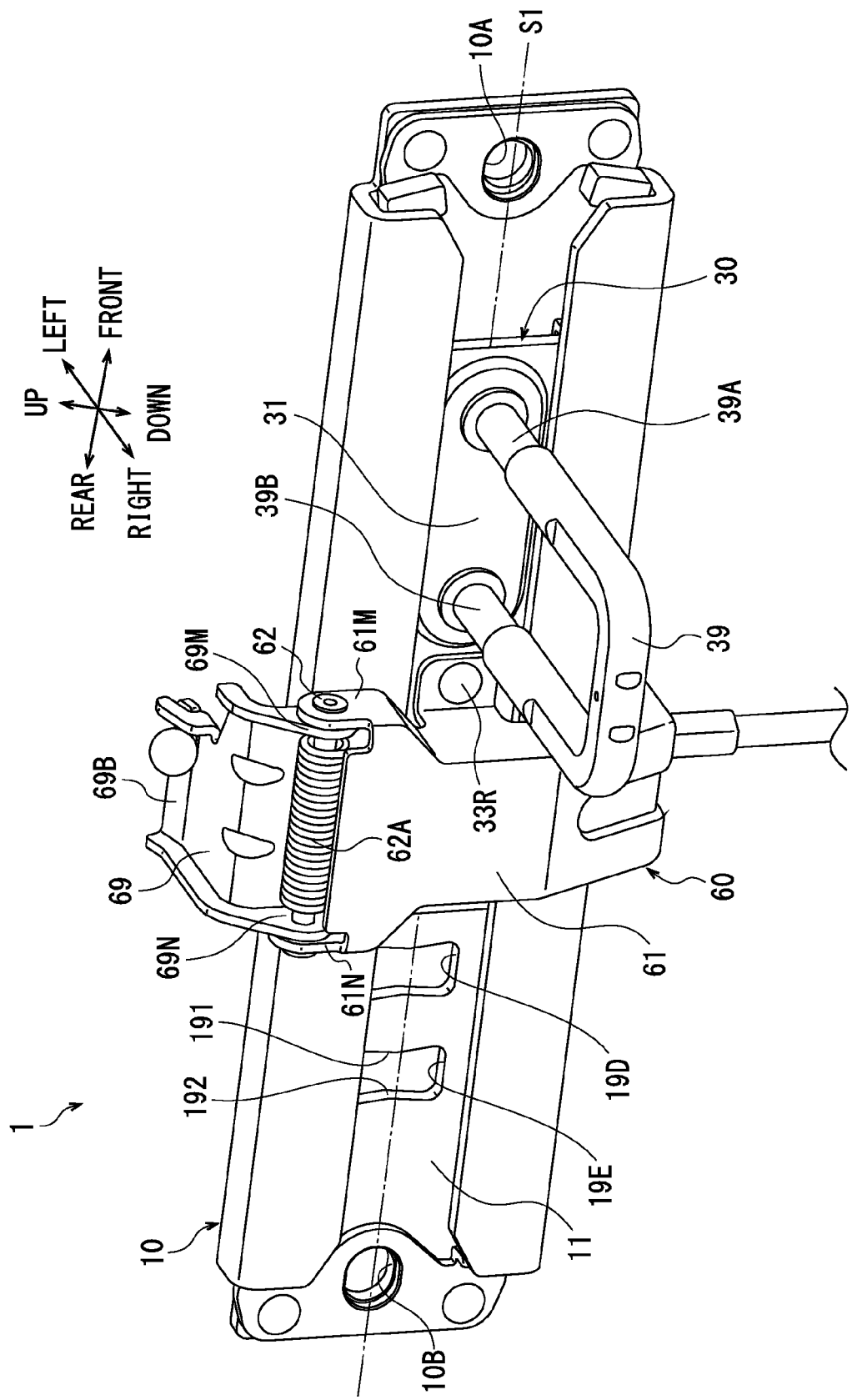
FIG. 2 is a perspective view of the vehicle seat reclining device of the exemplary embodiment.
Figure 3:
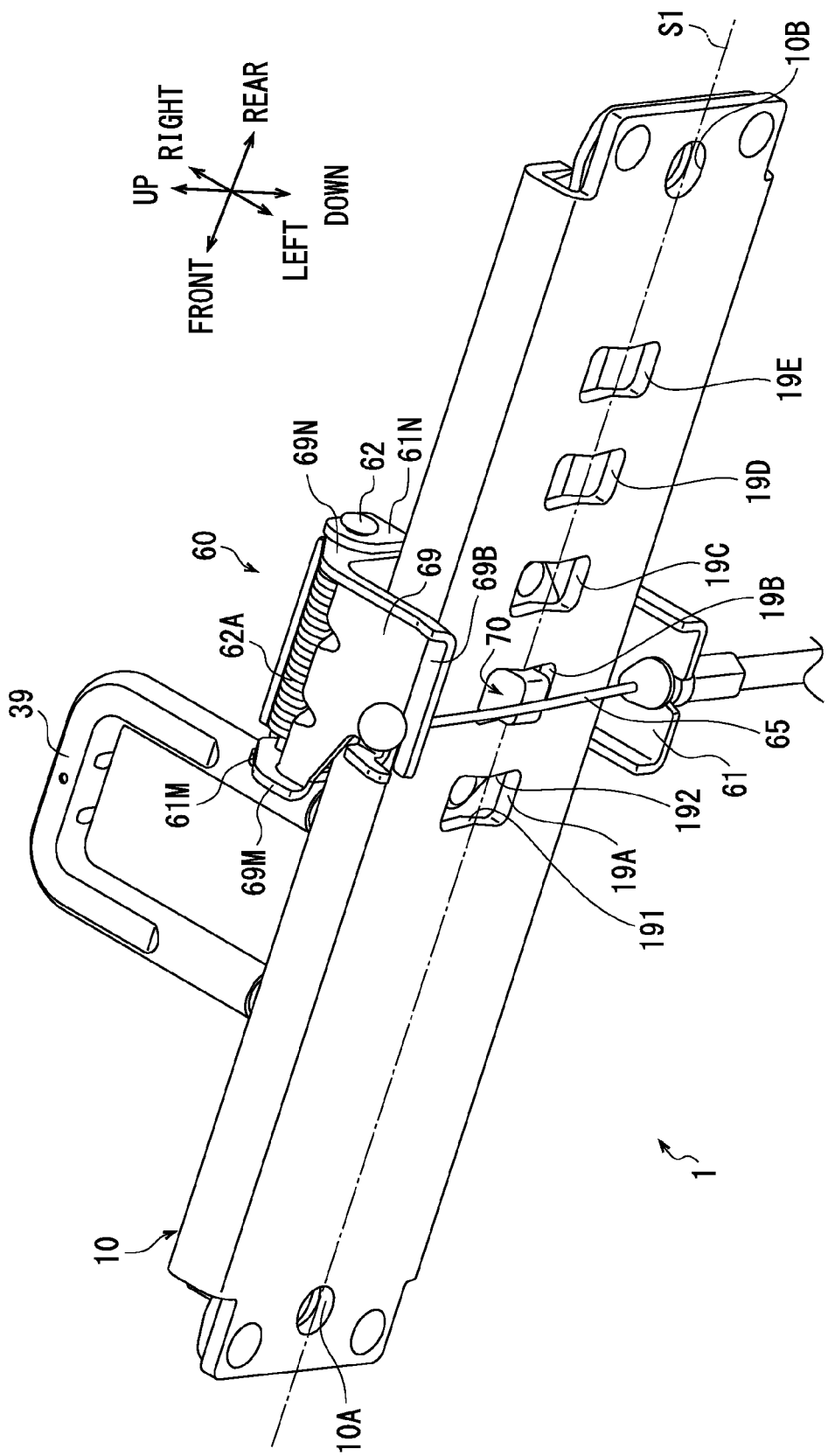
FIG. 3 is another perspective view of the vehicle seat reclining device of the exemplary embodiment.

As shown in FIGS. 2 and 3, mounting holes 10A, 10B are formed on a forward end side and a rearward end side of the rail 10, respectively. The rail 10 is affixed to the vehicle body 9 by inserting set screws or the like through these mounting holes 10A, 10B into the vehicle body 9. At this time, as shown in FIG. 1, the rail 10 is positioned on the vehicle body 9 such that the central axial line S1 of the rail 10 is at least substantially tangential to the arc C1 traced by the locking device 90 when the backrest 7 is tilted forward and rearward. That is, the central axial line S1 of the rail 10 preferably at least overlaps and/or intersects the arc C1 while being substantially parallel to or aligned with a tangent of the arc C1.

Figure 4:
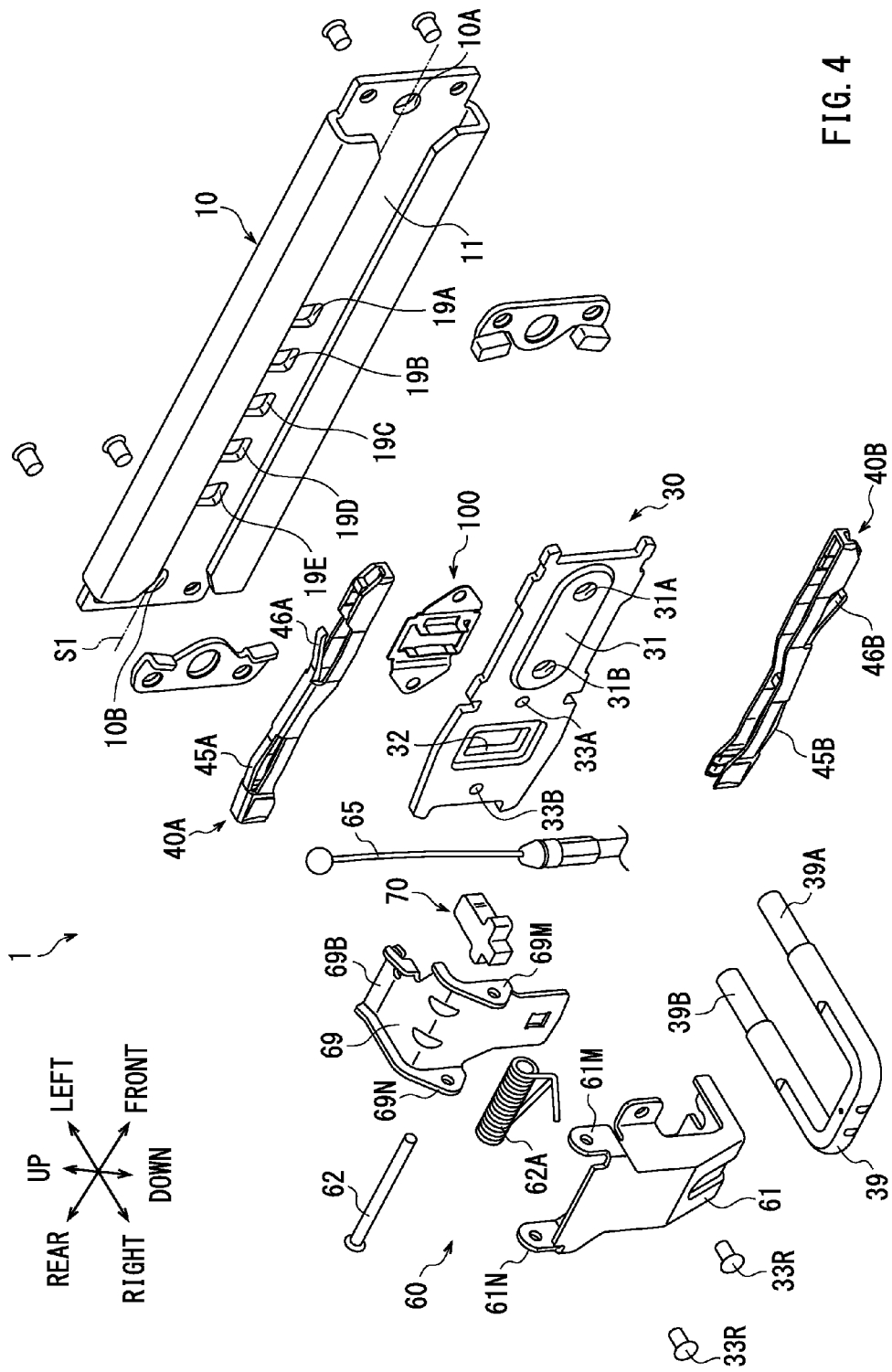
FIG. 4 is an exploded perspective view of the vehicle seat reclining device of the exemplary embodiment.
Figure 5:
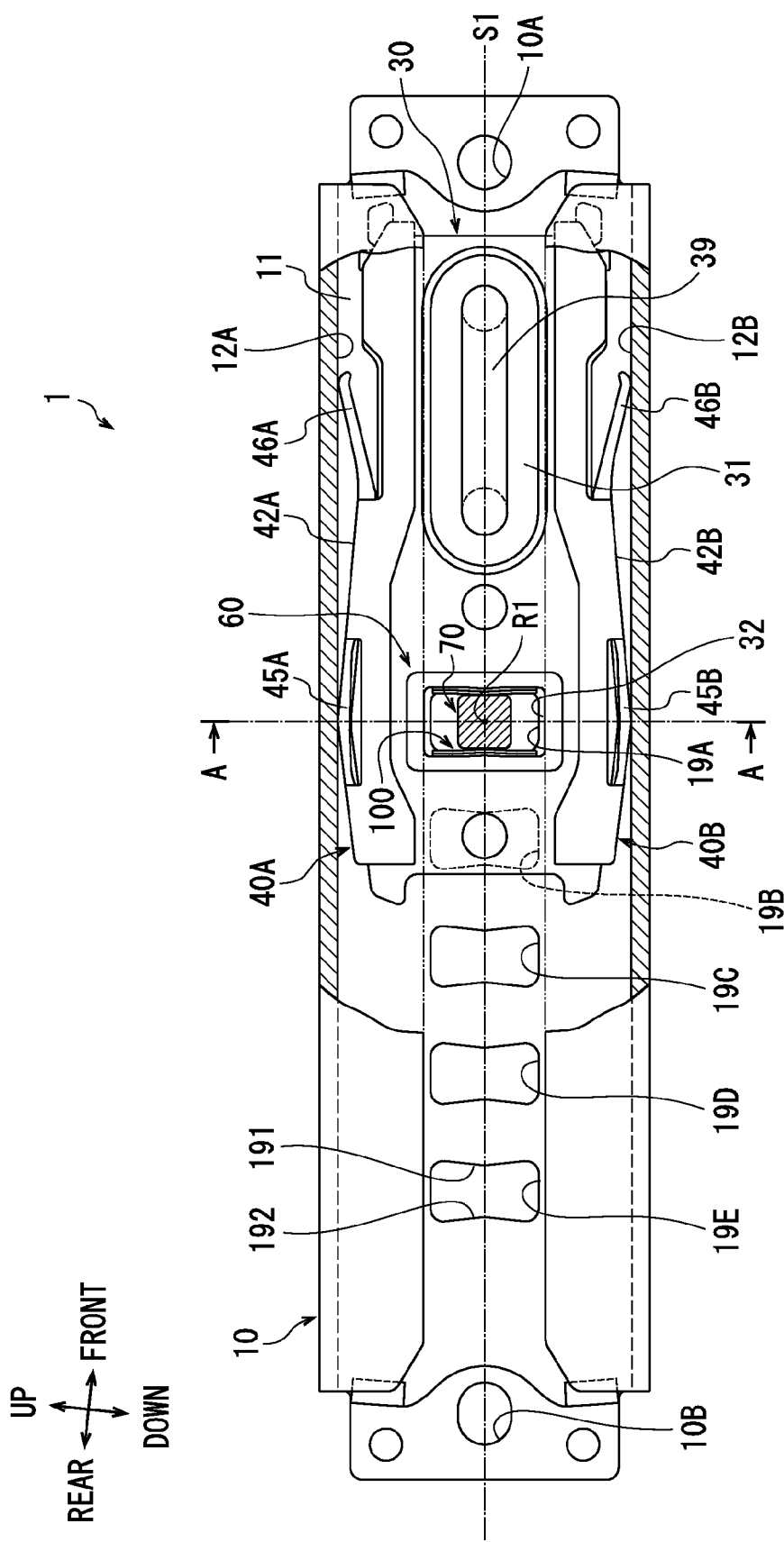
FIG. 5 is a partial cross-sectional view of the vehicle seat reclining device of the exemplary embodiment, illustrating a rail, a slider, a shock absorbing member, a latch projection, etc.
Figure 6:
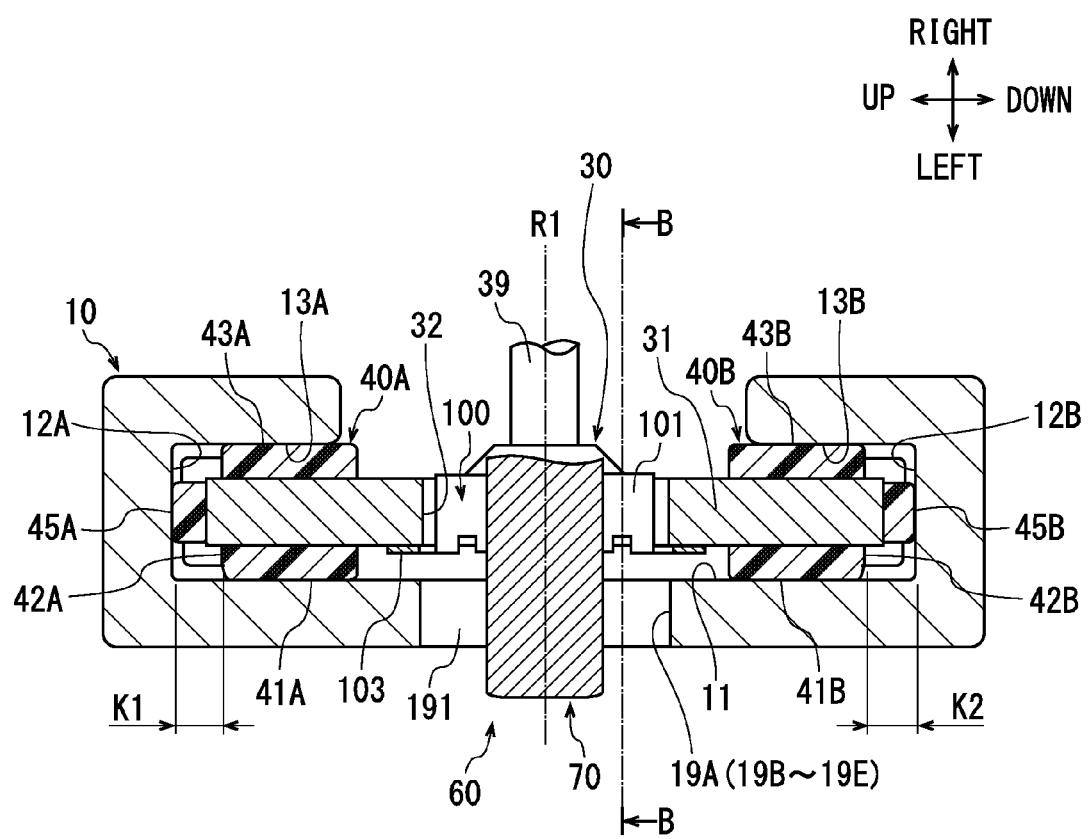
FIG. 6 is a partial cross-sectional view of the vehicle seat reclining device of the exemplary embodiment, illustrating a cross section taken along line A-A in FIG. 5.
Figure 9:
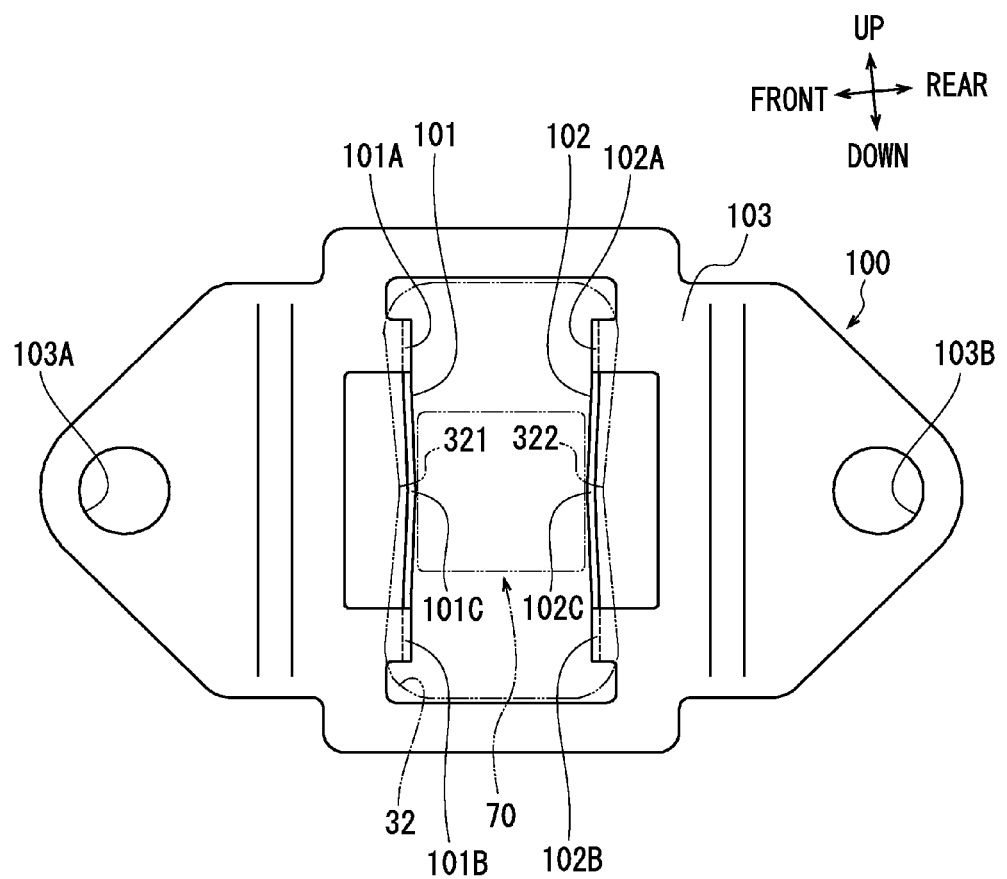
FIG. 9 is a plan view of the vehicle seat reclining device of the exemplary embodiment, illustrating the shock absorbing member.

As shown in FIGS. 3 to 5, five latch holes 19A, 19B, 19C, 19D and 19E penetrate through the first guide surface 11 of the rail 10 and extend along the central axial line S1. The latch holes 19A-19E each have a generally rectangular shape that is longer in the width direction of the first guide surface 11. More specifically, the longer sides of the latch holes 19A-19E preferably bend or curve slightly inward relative to each other so that the opposing longer sides approach each other on the central axial line S1 as illustrated in FIG. 5. In other words, middle portions of the longer sides of each latch hole 19A-19E are closer to each other along the central axial line S1 than the end portions of the longer sides. In FIGS. 5 and 9, the degree of inward bending has been exaggerated for illustrative purposes and is necessarily not to scale.

Figure 7:
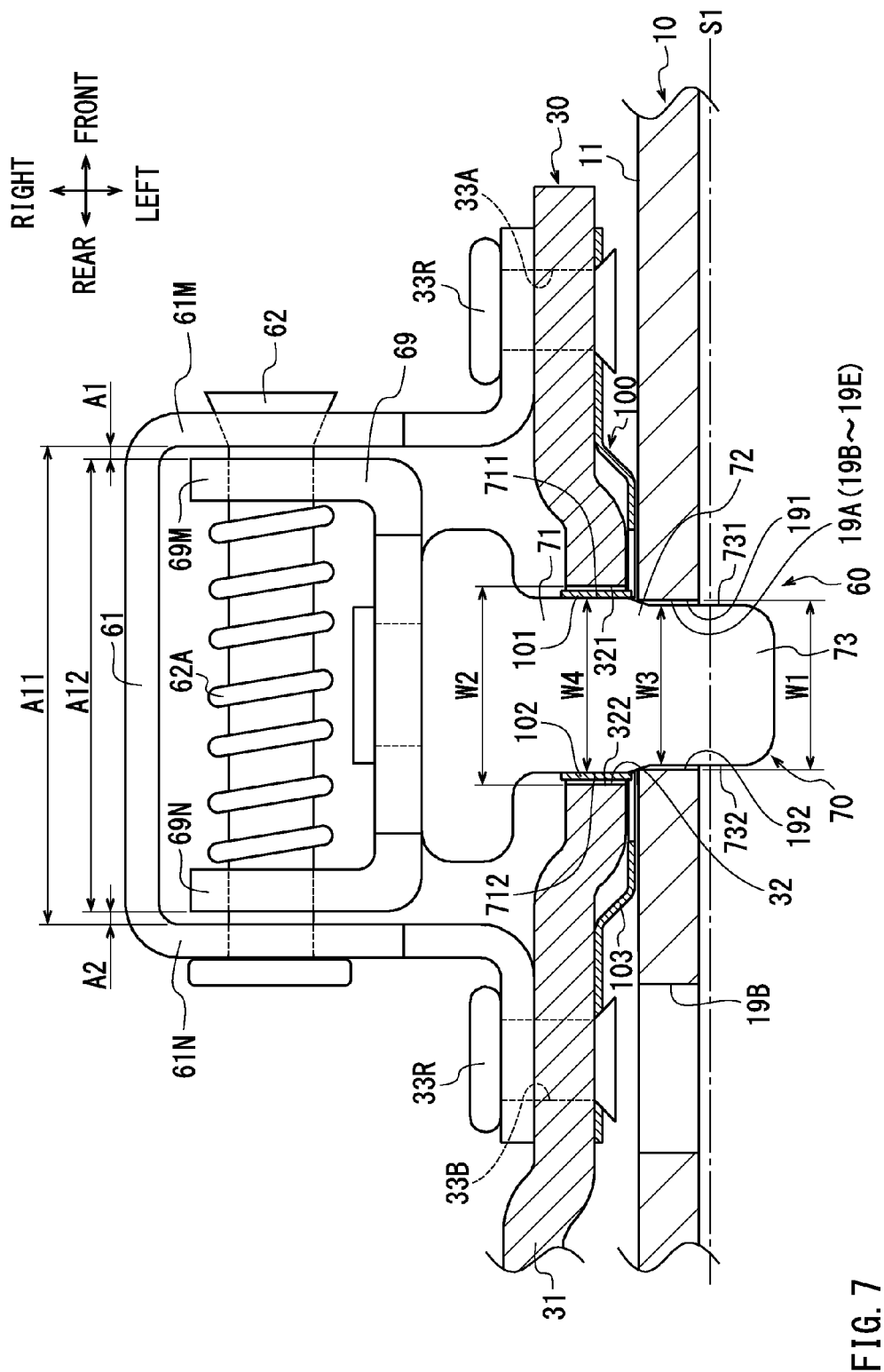
FIG. 7 is a partial cross-sectional view of the vehicle seat reclining device of the exemplary embodiment, illustrating a cross section taken along line B-B in FIG. 6.

As illustrated in more detail in FIG. 7, a first inner surface 191 on the front side (i.e. one side in the direction of the central axial line S1) of each latch hole 19A-19E and a second inner surface 192 on the rear side (i.e. on the other side in the direction of the central axial line S1) of each latch hole extend in parallel to the direction that the latch holes 19A-19E penetrate through the rail 10. In addition, a first distance W1 is defined between the first inner surface 191 and the second inner surface 192, as will be further discussed below.

As illustrated in FIGS. 4-6 and 8, the slider 30 includes a slider main body 31, and a pair of sliding portions (layers or edges) 40A and 40B.

Referring to FIG. 4, the slider main body 31 may be formed by punch-pressing a metallic steel plate and has a generally rectangular shape that is longer in the direction of the central axial line S1. Two post holes 31A, 31B penetrate through a forward portion of the slider main body 31. On the other side, a slider hole 32 penetrates through a rearward portion of the slider main body 31. A pair of rivet holes 33A and 33B are respectively disposed on the forward and rearward sides of the slider hole 32. The slider hole 32 has a generally rectangular shape that is longer in the width direction of the slider main body 31. More particularly, the longer sides of the slider hole 32 bend or curve to come closer to each other on the central axial line S1 as illustrated by a double-dashed chain line in FIG. 9. Again, in FIGS. 7, 9 and 10, etc., the degree of inward bending has been exaggerated for illustrative purposes and is not to scale. The latch holes 19A-E and the slider hole 32 can also be described as being "hour-glass" shaped.

As illustrated in FIG. 7, a first inner surface 321 on the front side (i.e. one side in the direction of the central axial line S1) of the slider hole 32 and a second inner surface 322 on the rear side (i.e. on the other side in the direction of the central axial line S1) of the slider hole 32 extend in parallel to the lateral direction in which the slider hole 32 penetrates through the slider 30. In addition, the first inner surface 321 and the second inner surface 322 are separated or spaced apart by a second distance W2 that is wider than the first distance W1.

Figure 8:
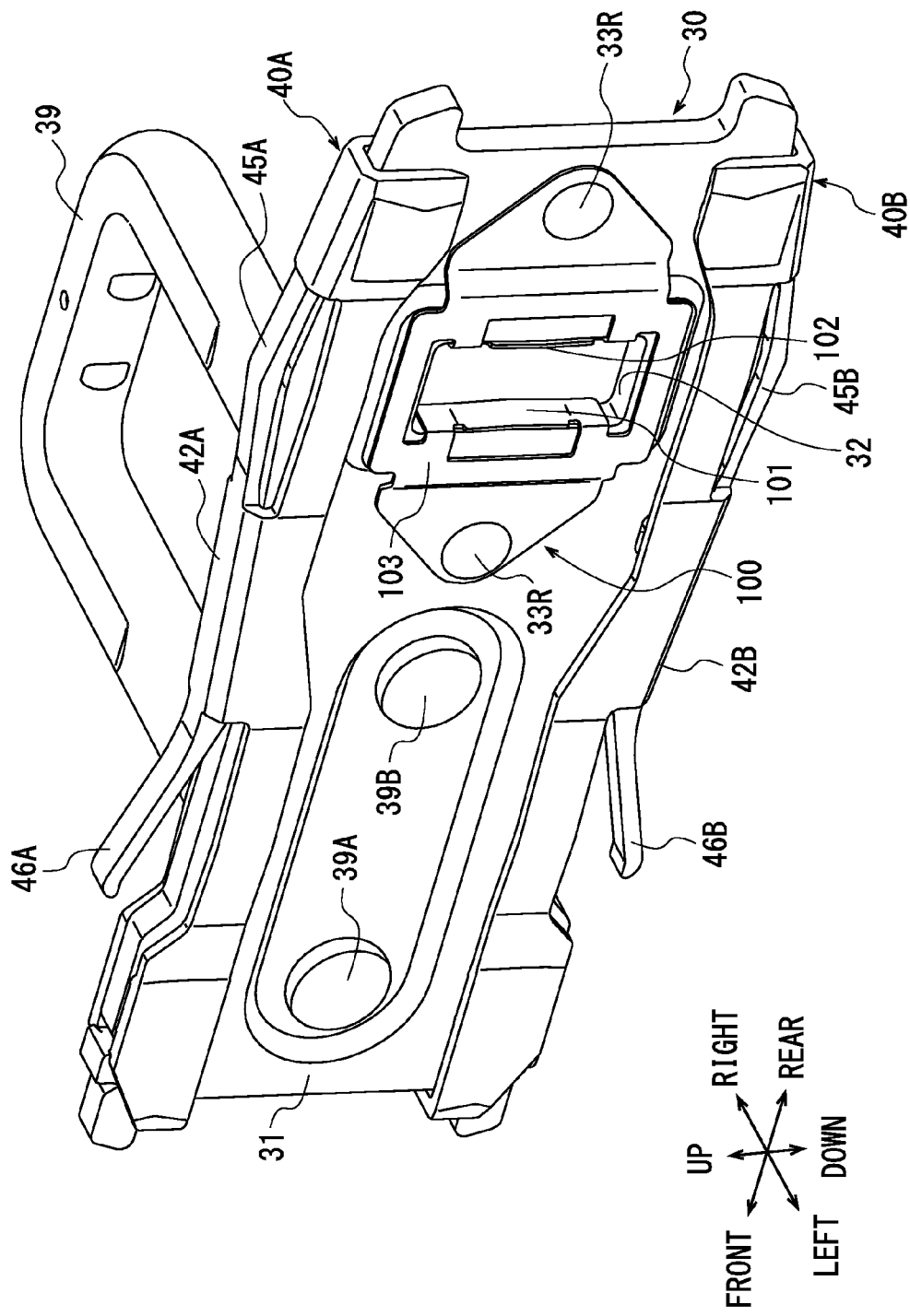
FIG. 8 is a perspective view of the vehicle seat reclining device of the exemplary embodiment, illustrating the slider and the shock absorbing member.

As shown in FIGS. 2 and 8, a striker 39 is affixed to the slider main body 31. Referring to FIG. 4, the striker 39 may be formed by bending a metallic round bar so as to have a substantially "U" shape. The striker 39 is fixedly connected to the slider main body 31 by inserting its front end portion 39A and rear end portion 39B through the respective post holes 31A, 31B and then welding or heat caulking or crimping. A portion of the front end portion 39A of the striker 39 is inserted into the above-mentioned recessed opening 91 of the locking device 90 in order to engage with the locking device 90.

As shown in FIGS. 4 to 6 and 8, the sliding portions (layers) 40A, 40B are resin members that are respectively mounted on an upper edge and a lower edge of the slider main body 31. The upper sliding portion 40A extends along and covers the upper edge of the slider main body 31 from the right side to the left side. The lower sliding portion 40B extends along and covers the lower edge of the slider main body 31 from the right side to the left side. Suitable examples of a resin for forming the two sliding portions 40A, 40B include resin materials exhibiting excellent wear-resistance and/or excellent sliding properties (for instance, POM (polyacetal) resin, PA (polyamide, e.g., nylon) resin, etc.).

As shown in FIG. 6, the slider 30 is housed in the rail 10. In the following description, the surfaces of the respective sliding portions 40A, 40B that face the first guide surface 11 will be called "first guided surfaces" 41A, 41B, the pair of surfaces that face the respective second guide surfaces 12A, 12B will be called "second guided surfaces" 42A, 42B, and the pair of surfaces that face the respective third guide surfaces 13A, 13B will be called "third guided surfaces" 43A, 43B.

The first guided surfaces 41A and 41B respectively are in sliding contact with the first guide surface 11 without rattling. The third guided surfaces 43A and 43B respectively are in sliding contact with the third guide surfaces 13A and 13B without rattling.

Clearances K1 and K2 in the width direction (the lateral (up-down) direction of the drawing sheet of FIG. 6) are respectively defined between the second guide surfaces 12A and 12B and the second guided surfaces 42A and 42B. Rotatable (rounded) portions 45A and 45B respectively project outward from the second guided surfaces 42A and 42B in the width (lateral) direction and will be further described below. As was mentioned above, the slider 30 is configured to be slidable along the central axial line S1 of the rail 10. Furthermore, the striker projects outward from the rail 10 in the depth (right-left) direction between the third guide surfaces 13A and 13B. Consequently, the striker 39 is movable in an integral manner with the slider 30 along the central axial line S1.

As shown in FIGS. 2-4, a support portion 61 is fixedly attached to the slider main body 31. The support portion 61 may be formed by punch pressing a metallic steel plate, and is configured to cover the slider hole 32 from the right side. The support portion 61A has a pair of flanges that project from the side walls in the forward and rearward directions and are attached to the slider main body 31 by two rivets 33R which are inserted through the rivet holes 33A and 33B while extending along a rightward-facing surface of the slider main body 31. In this state, as illustrated in FIG. 8, a surrounding portion 103 of a shock absorbing member 100 is joined with the support portion 61 by the rivets 33R and extends along a leftward-facing surface of the slider main body 31.

Figure 10:
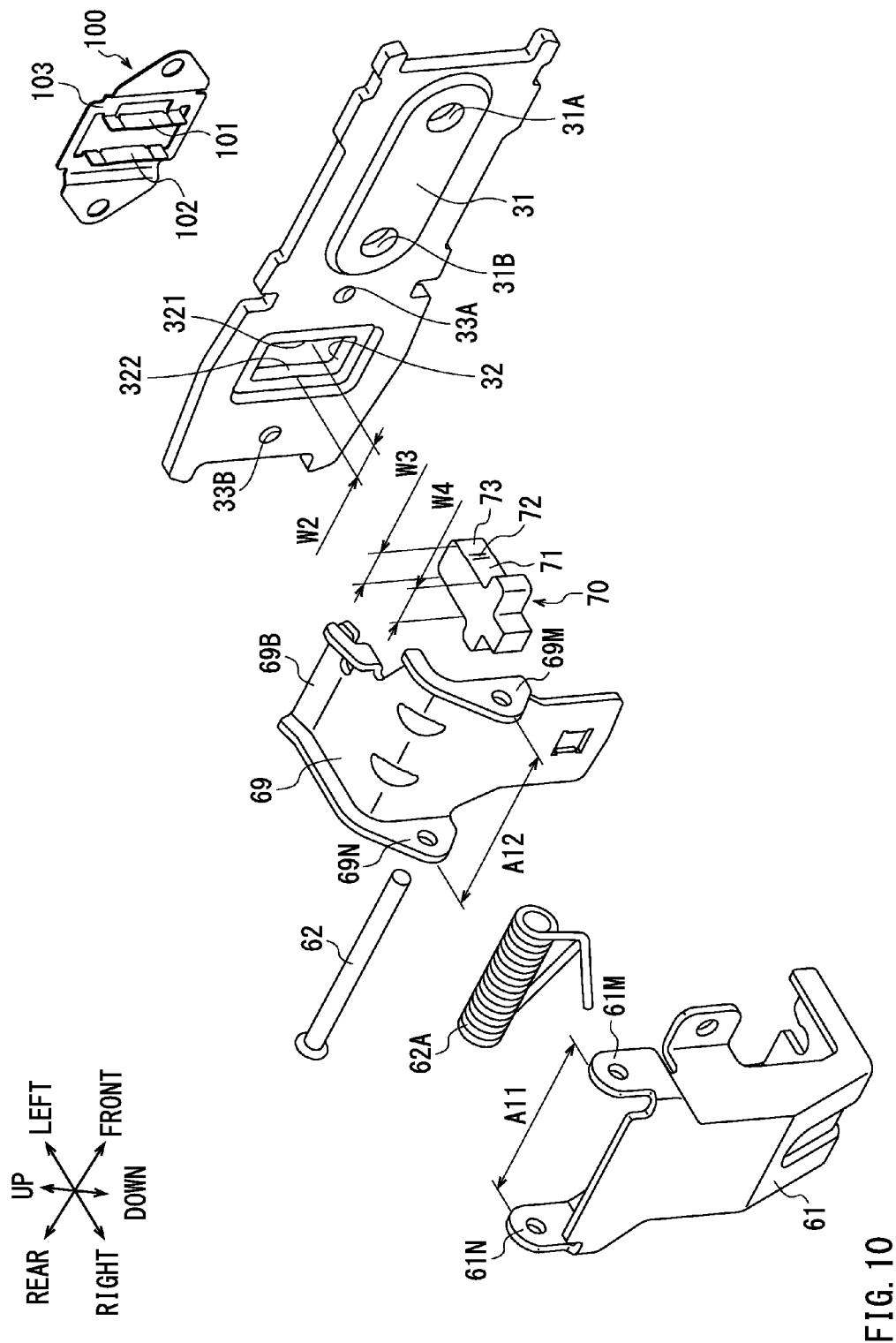
FIG. 10 is an exploded perspective view of the vehicle seat reclining device of the exemplary embodiment, illustrating a slider main body, a support portion, a movable portion, the latch projection, the shock absorbing member, etc.

As shown in FIGS. 7 and 10, a pair of flanges 61M, 61N are formed on an upper end side of the support portion 61. The flanges 61M, 61N are bent so as to have a substantially "U" shape and project towards the slider main body 31. A pivot shaft 62 is supported at both ends by the respective flanges 61M, 61N and is retained in a position parallel to the central axial line S1. A torsion coil spring 62A is fitted around the pivot shaft 62.

As illustrated in FIGS. 2-4 and 7, the support portion 61 supports a movable portion 69 so as to be pivotable about the pivot shaft 62. More particularly, the movable portion 69 may be formed by punch pressing a metallic steel plate and includes a pair of flanges 69M, 69N. The flanges 69M, 69N project perpendicularly (in the width direction) from an intermediate portion of the movable portion 69 and are bent so as to have a substantially "U" shape. The movable portion 69 is supported on the support portion 61 by inserting the pivot shaft 62 into shaft holes defined in the respective flanges 69M and 69N of the movable portion 69 such that the flanges 69M and 69N are interposed between the respective flanges 61M and 61N of the support portion 61. The movable portion 69 may be embodied, e.g., as a lever.

As illustrated in FIGS. 7 and 10, a distance (clearance or space) A11 between the facing inner wall surfaces of the respective flanges 61M and 61N is larger than a distance (clearance or space) A12 between opposing outer wall surfaces of the respective flanges 69M and 69N by several tenths of 1 mm to several mm.

As illustrated in FIG. 7, a first amount of space (clearance or play) A1 in the direction of central axial line S1 is provided between the flange 61M of the support portion 61 on the front side (i.e. one end side in the direction of the central axial line S1) and the flange 69M on the front side of the movable portion 69 (i.e. the same end side in the direction of the central axial line S1). A second amount of space (clearance or play) A2 in the direction of the central axial line S1 is provided between the flange 61N of the support portion 61 on the rear side (i.e. the other end side in the direction of the central axial line S1) and the flange 69N on the rear side of the movable portion 69 (i.e. the same other end side in the direction of the central axial line S1). The sum of the first and second amounts of spaces A1+A2 is a value obtained by subtracting the distance A12 from the distance A11, i.e. A11−A12=A1+A2.

As illustrated in FIG. 7 and FIG. 10, the movable portion 69 includes an input portion 69B and a latch projection 70. The input portion 69B extends upward from the pivot shaft 62 of the movable portion 69 and bends in the leftward direction. The latch projection 70 has a stepped prism shape or crucifix-shape. A base side of the latch projection 70 is fixed, e.g., by caulking or crimping, to an end portion of the movable portion 69 that is lower than the pivot shaft 62. A tip end side of the latch projection 70 projects leftward. The torsion coil spring 62A urges the movable portion 69 to bias or move the latch projection 70 toward the first guide surface 11 of the rail 10.

Figure 11:
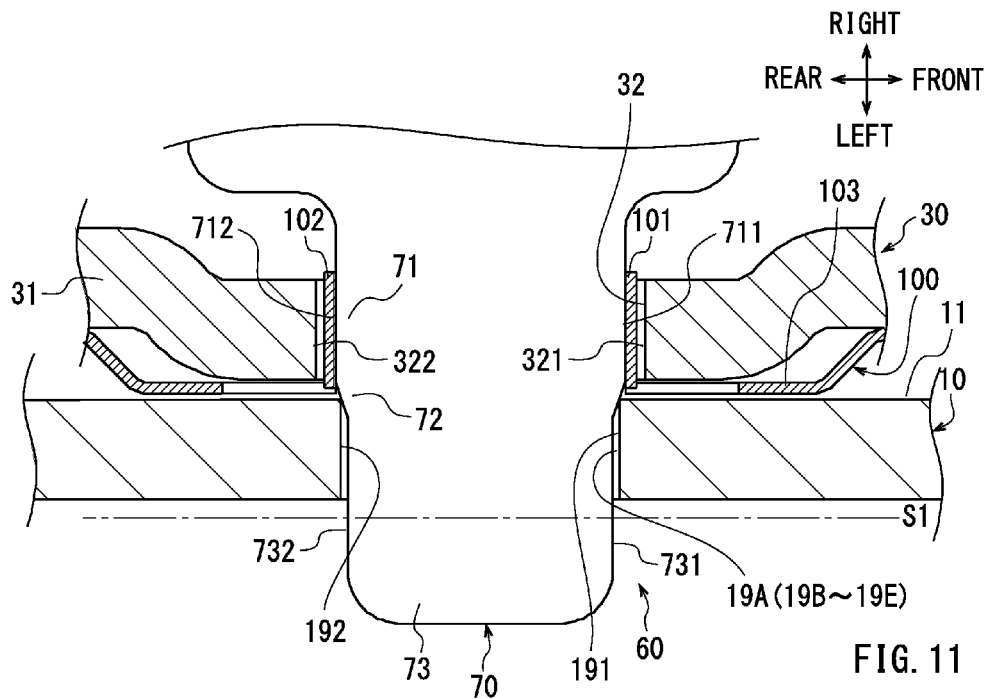
FIG. 11 is a partially enlarged cross-sectional view of the vehicle seat reclining device shown in FIG. 7.

As illustrated in FIGS. 7, 10 and 11, the latch projection 70 includes a base portion 71, an intermediate portion 72, and a tip end portion 73 in the direction from the base side to the tip end side of the latch projection 70.

A first outer surface 731 on the front side (i.e. one side in the direction of the central axial line S1) of the tip end portion 73 and a second outer surface 732 on the rear side (i.e. the other side in the direction of the central axial line S1) of the tip end portion 73 extend in parallel to the lateral (right-left) direction, which is the same direction that the latch holes 19A to 19E penetrate through the rail 10. Furthermore, the first outer surface 731 and the second outer surface 732 are spaced apart by a third distance W3 that is narrower (less) than the first distance W1 as shown in FIG. 7.

A first outer surface 711 on the front side (i.e. one side in the direction of the central axial line S1) of the base portion 71 and a second outer surface 712 on the rear side (i.e. the other side in the direction of the central axial line S1) of the base portion 71 extend in parallel to the lateral (right-left) direction, which is the same direction that the slider hole 32 penetrates through the slider 30. Furthermore, the first outer surface 711 and the second outer surface 712 are spaced apart by a fourth distance W4 that is wider (larger) than the first distance W1 but is narrower (less) than the second distance W2 as is also shown in FIG. 7.

The intermediate portion 72 is continuous with the first outer surface 731 and the second outer surface 732 of the tip end portion 73, and with the first outer surface 711 and the second outer surface 712 of the base portion 71. The intermediate portion 72 has a shape that tapers from the base side of the latch projection 70 toward the tip end side.

As illustrated in FIG. 7, a clearance or space (W2-W4) in the direction of the central axial line S1 is formed between the slider hole 32 and the base portion 71 of the latch projection 70. This clearance (W2-W4) is a value obtained by subtracting the fourth distance W4 of the base portion 71 from the second distance W2 of the slider hole 32.

As illustrated in FIGS. 6-11, at least a portion of the shock absorbing member 100 is disposed along the first inner surface 321 and the second inner surface 322 of the slider hole 32. The shock absorbing member 100 is a thin plate formed as a leaf spring by press punching and bending. The shock absorbing member 100 includes the surrounding portion 103 and a pair of resilient portions 101 and 102.

As illustrated in FIG. 9, the surrounding portion 103 has a generally rectangular shape with a hollow interior and is configured to surround the slider hole 32. Joint holes 103A and 103B penetrate through the surrounding portion 103. When the surrounding portion 103 is disposed so as to extend along the leftward-facing surface of the slider main body 31, the rivets 33R are inserted through the joint holes 103A and 103B and their tails are then caulked or upset. As a result, the surrounding portion 103 is joined with the support portion 61 and affixed to the slider 30.

The (first) resilient portion 101 on the front side bends rightward (i.e. towards the inner or far side of the drawing sheet in FIG. 9) at a substantially right angle from the front side of an inner peripheral edge of the surrounding portion 103, and protrudes between the first inner surface 321 of the slider hole 32 and the latch projection 70. The first resilient portion 101 extends orthogonal to the direction of the central axial line S1, and extends in the direction orthogonal to the direction in which the slider hole 32 penetrates through the slider 30. In other words, the first resilient portion 101 extends in the vertical (up-down) direction. Both ends 101A and 101B of the first resilient portion 101 continue to the front side of the inner peripheral edge of the surrounding portion 103. An intermediate portion 101C of the first resilient portion 101 bends or curves so as to approach the latch projection 70, i.e. the intermediate portion 101C is disposed closer to the latch projection in the front-rear direction than the ends 101A and 101B.

The (second) resilient portion 102 on the rear side bends rightward (towards the inner or far side of the drawing sheet in FIG. 9) at a substantially right angle from the rear side of the inner peripheral edge of the surrounding portion 103, and protrudes between the second inner surface 322 of the slider hole 32 and the latch projection 70. The second resilient portion 102 extends orthogonal to the direction of the central axial line S1, and extends in the direction orthogonal to the direction in which the slider hole 32 penetrates through the slider 30. In other words, the second resilient portion 102 extends in the vertical (up-down) direction. Both ends 102A and 102B of the second resilient portion 102 continue to the rear side of the inner peripheral edge of the surrounding portion 103. An intermediate portion 102C of the second resilient portion 102 bends or curves so as to approach the latch projection 70, i.e. the intermediate portion 102C is disposed closer to the latch projection in the front-rear direction than the ends 102A and 102B.

Because the shock absorbing member 100 is formed in such a shape, both resilient portions 101 and 102 are in sliding contact with the latch projection 70, which extends through the slider hole 32, while being resiliently deformed (i.e. while being in a state of resilient deformation).

Figure 12:
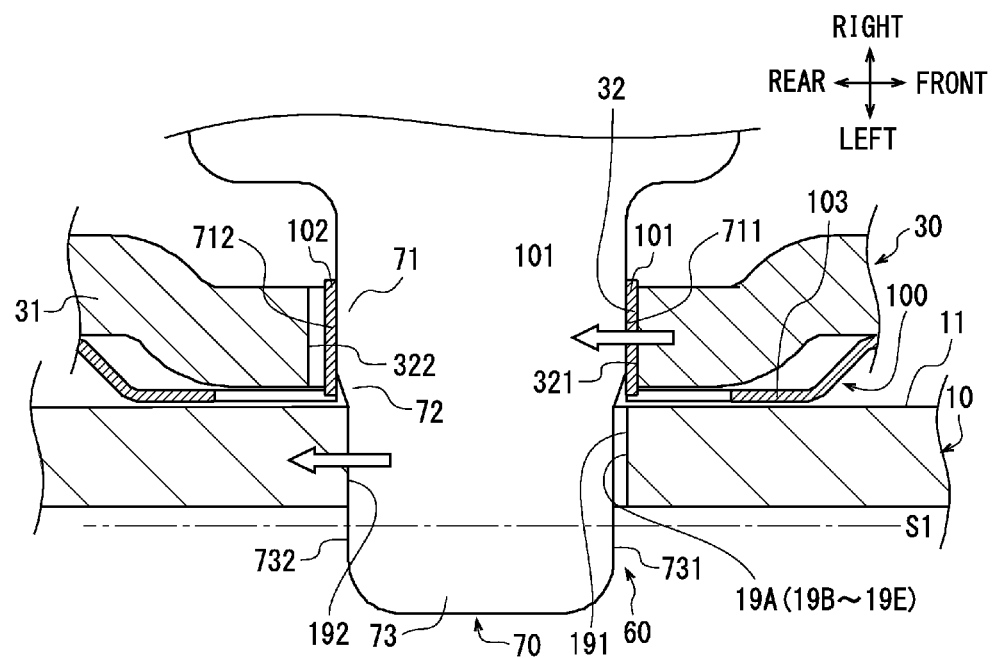
FIG. 12 is the same partial cross-sectional view as shown in FIG. 11, illustrating the path of force transmission via the slider, the latch projection, and the rail.

As illustrated in FIG. 12 (when considered together with FIG. 7), the first amount of space (clearance) A1 and the second amount of space (clearance) A2 have sufficient lengths such that they do not become zero even when the first resilient portion 101 of the shock absorbing member 100 is fully resiliently deformed between the latch projection 70 and the first inner surface 321 of the slider hole 32. Although an illustration is omitted, the first amount of space (clearance) A1 and the second amount of space (clearance) A2 also have sufficient lengths that do not become zero even when the second resilient portion 102 of the shock absorbing member 100 is fully resiliently deformed between the latch projection 70 and the second inner surface 322 of the slider hole 32. In other words, the sum of the widths of the widest portions of the resilient portions 101, 102 in the rear-front direction is less than W2 minus W4.

With the configuration as described above, when the latch projection 70 faces (opposes) any one of the latch holes 19A-19E of the rail 10, the latch projection 70 can be slid or pushed through (relative to) the slider hole 32 so as to engage the selected latch hole 19A-19E. As a consequence of this engagement, the slider 30 is prevented from sliding relative to the rail 10 along the central axial line S1. With this configuration of the exemplary vehicle seat reclining device 1, the distance between the first guide surface 11 of the rail 10 and the slider main body 31 is shortened. Therefore, the load applied to the latch projection 70 and the movable portion 69 can be reduced.

As illustrated in FIGS. 3 and 4, one end of a transmission cable 65 is coupled to the input portion 69B. Although an illustration is omitted, an adjusting (release) lever configured to adjust the tilted position of the backrest 7 is provided in the vicinity of the vehicle seat 8. The other end of the transmission cable 65 is coupled to the adjusting lever. When the passenger operates the adjusting lever in order to adjust the tilted position of the backrest 7, the movement of the adjusting lever is transmitted to the input portion 69B via the transmission cable 65. Therefore, the input portion 69B will be pulled downward. This will cause the movable portion 69 to pivot about the pivot shaft 62 against the biasing force of the torsion coil spring 62A, thereby causing the latch projection 70 to retract or move away from the first guide surface 11 of the rail 10. Therefore, the latch projection 70 will disengage from the respective latch hole 19A-19E. As a consequence of this disengagement, the slider 30 will be permitted to slide relative to the rail 10 along the central axial line S1.

Figure 13:
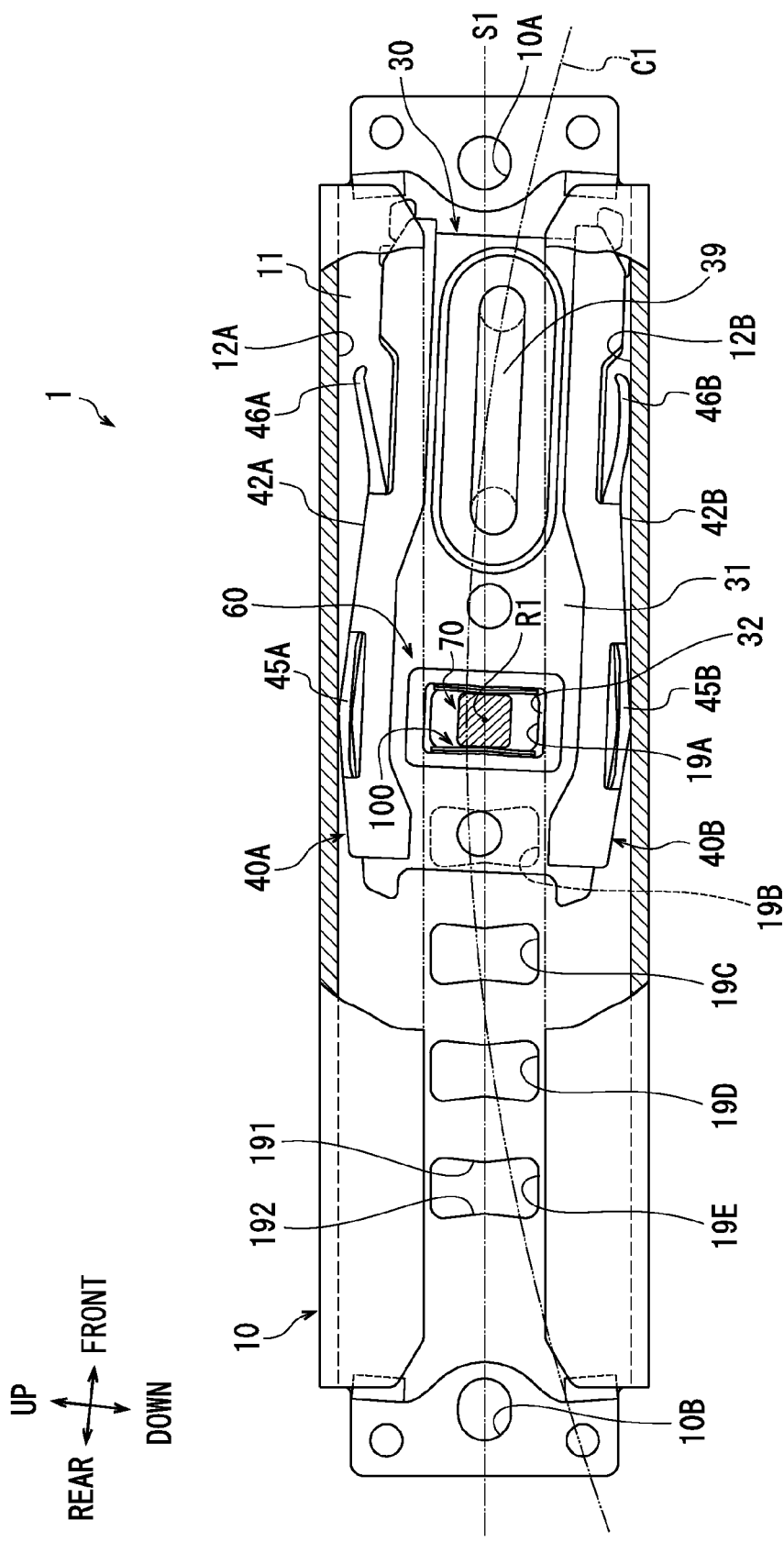
FIG. 13 is a partial cross-sectional view of the vehicle seat reclining device of the exemplary embodiment, illustrating the rail, the slider, the shock absorbing members, the latch projection, etc.

As shown in FIGS. 5 and 13, when the latch projection 70 is engaged in the forward-most latch hole 19A, the striker 39 is disposed at its forward-most position. Although an illustration is omitted, when the latch projection 70 is positioned to permit engagement with the rearward-most latch hole 19E, the striker 39 will be disposed at its rearward-most position.

In a preferred aspect of the present teachings, the latch mechanism 60 may include the movable portion 69 having the latch projection 70, the support portion 61, the five latch holes 19A to 19E, and the slider hole 32. As will be further discussed in the following, a rotational axis R1 may be defined or fall within a central portion of the latch projection 70 when the latch projection 70 is engaged with any one of the latch holes 19A to 19E as shown in FIGS. 5, 6, and 13.

As illustrated in FIGS. 4-6, 8, and 13, a pair of rotatable (rounded) portions 45A, 45B respectively project radially relative to the rotational axis R1 and are integrally formed with the respective sliding portions 40A and 40B. The rotatable (rounded) portions 45A, 45B respectively extend along the upper edge and the lower edges of the slider main body 31 and bend outward in the width direction of the slider main body 31. The rotatable portions 45A and 45B are respectively resiliently deformed due to being sandwiched between the second guide surface 12A or the second guide surface 12B and the upper edge or the lower edge of the slider main body 31 in the rail 10.

The resiliently deformed rotatable portions 45A, 45B each form a curved surface that is substantially the same as a portion of an imaginary cylindrical-shaped surface whose center is the rotational axis R1 and whose radius equals the distance between the rotatable axis R1 and the respective second guide surfaces 12A, 12B (i.e. one half of the distance between the two second guide surfaces 12A, 12B). Accordingly, the rotatable portions 45A, 45B narrow or even eliminate the clearances K1, K2 between the respective second guide surfaces 12A, 12B and the respective guided surfaces 42A, 42B. Preferably, when the slider 30 pivots about the rotational axis R1 away from abase or original rotational position where a longitudinal axis of the slider 30 is aligned with the central axial line S1 (i.e. the position shown in FIG. 5), the respective rotatable portions 45A, 45B will be constantly in sliding contact with the second guide surfaces 12A, 12B. As a result, the slider 30 will pivot about the rotational axis R1 without any positional displacement of the slider 30 relative to the rail 10 in the width direction.

As illustrated in FIGS. 4, 5, 8, and 13, a pair of biasing (spring) portions 46A and 46B are integrally formed at the front end portions of the respective sliding portions 40A and 40B. The biasing portions 46A and 46B respectively project obliquely from the respective sliding portions 40A and 40B outward in the width (up-down) direction, and are in sliding contact with the respective second guide surfaces 12A and 12B while being resiliently deformed.

When the front end portion 39A of the striker 39 is not in engagement with the locking device 90, as illustrated in FIG. 5, the slider 30 is not rotatably offset about the rotational axis R1, i.e. it is in its base or original rotational position. Further, the striker 39 is positioned so as to be aligned with the central axial line S1 as shown in FIG. 5 due to the biasing forces of the respective biasing portions 46A and 46B.

On the other hand, as illustrated in FIG. 13, when the front end portion 39A of the striker 39 is engaged with the locking device 90 at a position where the central axial line S1 is upwardly shifted relative to the arc or curved path C1, a moment acts that causes the striker 39 to pivot clockwise about the rotational axis R1. This causes the slider 30 to pivot about the rotational axis R1 and thus absorb the displacement or deviation between the arc or curved path C1 and the central axial line S1. At this time, the biasing portion 46B is firmly pressed against the second guide surface 12B and is thus further elastically deformed. As a result, a restoring force generated by the biasing portion 46B will act on the slider 30 to urge the slider 30 to return to its original position by pivoting back about the rotational axis R1. Therefore, the slider 30 can easily return to its original position relative to the rotational axis R1 in cases in which the front end portion 39A of the striker 39 is not engaged with the locking device 90 or the slider 30 is moved rearward.

While not shown in the drawings, when the slider 30 pivots about the rotational axis R1 relative to the rail 10 in a direction opposite to the above direction (e.g., counterclockwise), the biasing portion 46A will urge the slider 30 to return to its original position by pivoting back about the rotational axis R1.

Advantageous Effects of the Present Teachings

In the vehicle seat reclining device 1 of the above-described exemplary embodiment, a space or clearance (W2-W4) in the direction of the central axial line S1 is provided between the slider hole 32 and the latch projection 70. The shock absorbing member 100 is provided between the first inner surface 321 on the front side of the slider hole 32 and the second inner surface 322 on the rear side of the slider hole 32. The shock absorbing member 100 is in sliding contact with the latch projection 70 while being resiliently deformed. Consequently, the clearance (W2-W4) in the direction of the central axial line S1 is filled by the shock absorbing member 100 arranged in this manner between the slider hole 32 and the latch projection 70. Therefore, in such a vehicle seat reclining device 1, even when a force acts on the slider 30 due to vibrations, etc. generated when the vehicle is moving and causes the slider 30 to shake or oscillate in the fore-and-aft direction relative to the rail 10, because the resiliently-deformed shock absorbing member 100 is sandwiched between the latch projection 70 and the slider hole 32 in the direction of the central axial line S1, the latch projection 70 does not repeatedly collide with the sides of the slider hole 32. Consequently, in such a vehicle seat reclining device 1, it is possible to suppress or minimize the generation of undesirable rattling noise between the slider hole 32 and the latch projection 70. In addition, due to the presence of the shock absorbing member 100, undesirable noise caused by the latch projection 70 scraping against the sides of the slider hole 32 may also be suppressed or minimized.

Furthermore, in such a vehicle seat reclining device 1, the size of the clearance (W2-W4) between the slider hole 32 and the latch projection 70 may be increased (as compared to prior art device) as a result of the advantages and effects provided by the shock absorbing member 100. Therefore, in such a vehicle seat reclining device 1, even if the dimensional tolerance control during manufacturing with respect to the clearance (W2-W4) between the slider hole 32 and the latch projection 70 is simplified or made less strict (narrow), it is still unlikely that the latch projection 70 will be caught on, or blocked by, the slider hole 32 during its sliding movement through (relative to) the slider hole 32.

Therefore, in such a vehicle seat reclining device 1, it is possible to both suppress/minimize the generation of the undesirable noise between the slider hole 32 and the latch projection 70 as well as achieve a smooth engagement of the latch projection 70 relative to the respective latch holes 19A to 19E at a relatively low cost.

Moreover, in such a vehicle seat reclining device 1, the intermediate portion 72 is designed to firmly abut on both the first inner surface 191 and the second inner surface 192, i.e. on both sides of the latch hole 19A in the direction of the central axial line S1, as illustrated in FIG. 11. Accordingly, the latch projection 70 can reliably engage (directly contact) the respective latch holes 19A-19E without a clearance.

Therefore, as illustrated in FIG. 12, even if a force causes the slider 30 to move relative to the rail 10 towards the other side, e.g. towards the rear side in the direction of the central axial line S1, while the latch projection 70 is engaged in one of the latch holes 19A-19E, the force is transmitted between the slider 30 and the rail 10 via the first inner surface 321, the (first) resilient portion 101 (which is a resiliently deformed portion of the shock absorbing member 100), the latch projection 70, and the second inner surface 192 of the engaged latch hole 19A-19E. In this case, the first amount of space (clearance) A1 and the second amount of space (clearance) A2 provided between the support portion 61 and the movable portion 69 do not become zero even when the resilient portion 101 is fully resiliently deformed between the latch projection 70 and the first inner surface 321 of the slider hole 32. Although an illustration is omitted, when an oppositely-directed force urges the slider 30 to move relative to the rail 10 towards the other side along the direction of the central axial line S1, i.e. the force urges the slider 30 to move forward, while the latch projection 70 is engaged in one of the latch holes 19A-19E, the force is transmitted from the slider 30 to the rail 10 via the second inner surface 322 of the slider hole 32, the (second) resilient portion 102 (which is a resiliently deformed portion of the shock absorbing member 100), the latch projection 70, and the first inner surface 191 of the engaged latch hole 19A-19E. In this case as well, the first amount of space (clearance) A1 and the second amount of space (clearance) A2 provided between the support portion 61 and the movable portion 69 do not become zero even when the shock absorbing member 102 is fully resiliently deformed between the latch projection 70 and the second inner surface 322 of the slider hole 32. Accordingly, the transmission of the force between the slider 30 and the rail 10 does not involve or pass through the support portion 61 or the movable portion 69. Therefore, the structural strength or rigidity of the support portion 61 may be reduced, as compared to known devices, which enables the production cost (and possibly also the weight) of the vehicle seat reclining device 1 to also be reduced.

In addition, in such a vehicle seat reclining device 1, when the force is transmitted between the slider 30 and the rail 10, as illustrated in FIG. 12 for example, the first inner surface 191 of the latch hole and the first outer surface 731 of the tip end portion, or the second inner surface 192 of the latch hole and the second outer surface 732 of the tip end portion, come into abutment in a parallel state. Also, the first inner surface 321 of the slider hole and the first outer surface 711 of the base portion, or the second inner surface 322 of the slider hole and the second outer surface 712 of the base portion, come into abutment with each other in a parallel state with the shock absorbing member 100 interposed therebetween. Therefore, the force is reliably transmitted between the slider 30 and the rail 10 via the first inner surface 321 or the second inner surface 322 of the slider hole, the resiliently deformed shock absorbing member 100, the first outer surface 711 or the second outer surface 712 of the base portion, the intermediate portion 72, the first outer surface 731 or the second outer surface 732 of the tip end portion, and the first inner surface 191 or the second inner surface 192 of the engaged latch hole.

In addition or in the alternative, as illustrated in FIG. 11, if the intermediate portion 72 is designed so as to taper from the base side toward the tip end side, the tapered sides can dig (firmly fit) into the engaged latch hole 19A-19E. Therefore, the latch projection 70 and the engaged latch hole 19A-19E come into reliable abutment on both sides in the direction of the central axial line S1, i.e. on both the front side and the rear side thereof. Therefore, rattling between the latch projection 70 and the engaged latch hole 19A-19E can be eliminated. Consequently, in such a vehicle seat reclining device 1, it is possible to suppress or minimize the generation of undesirable noise between the latch projection 70 and the engaged latch hole 19A-19E.

In addition or in the alternative, in such a vehicle seat reclining device 1, the shock absorbing member 100 may be preferably formed from or comprised of spring steel. In this case, the durability of the shock absorbing member 100 can be improved or increased as compared to a shock absorbing member formed from a soft material such as rubber or resin.

In addition or in the alternative, in such a vehicle seat reclining device 1, the shock absorbing member 100 preferably includes the surrounding portion 103 and a pair of resilient portions 101 and 102. This design enables the shock absorbing member 100 to be easily manufactured from a thin-plate shaped, or a linear shaped, spring steel, which also enables the production costs to be reduced.

In addition or in the alternative, in such a vehicle seat reclining device 1, both resilient portions 101 and 102 may preferably extend orthogonal to the direction of the central axial line S1, and may preferably extend in the direction orthogonal to the direction in which the slider hole 32 penetrates through the slider 30. Further, both ends 101A, 101B, 102A, and 102B of the resilient portions 101 and 102 may continue to the surrounding portion 103. The intermediate portions 101C and 102C of the resilient portions 101 and 102 may bend or curve so as to approach the latch projection 70. As a result, resilient portions 101 and 102 having such a shape may easily undergo nonlinear resilient deformation. Therefore, the characteristics/properties of the resilient portions 101 and 102 may easily be set in such a manner that initially the pressing force against the latch projection 70 is weak, but it increases abruptly or sharply against the latch projection 70 as the deformation progresses.

In addition or in the alternative, in such a vehicle seat reclining device 1, the support portion 61 and the surrounding portion 103 are joined to the slider 30. Therefore, it is possible to achieve a simplification of the assembly steps as compared to an embodiment in which the support portion 61 and the surrounding portion 103 are separately mounted on the slider 30.

Although the invention has been described with reference to an exemplary embodiment, the invention is not limited thereto, and may be modified in any appropriate manner that does not depart the scope or spirit of the invention.

For example, although the central axial line S1 extends linearly or straight in the exemplary embodiment, the invention is not limited thereto. The central axial line may extend, e.g., in an arc-like (curved) shape.

In addition or in the alternative, although the exemplary shock absorbing member 100 is formed from a thin plate made of spring steel and the surrounding portion 103 has a hollow interior in the exemplary embodiment, the invention is not limited thereto. For example, the shock absorbing member may instead be a rod member formed from spring steel or may be a resin-made member. In addition or in the alternative, the surrounding portion may have, for example, a C-shape or D-shape.

The invention is generally applicable to a wide variety of types of vehicles, including but not limited to passenger vehicles, buses and industrial (commercial) vehicles, such as trucks.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vehicle seat reclining devices and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

9: vehicle body
8: vehicle seat
7: backrest
90: locking device
1: vehicle seat reclining device
S1: central axial line
C1: path traced by the locking device
10: rail
39: striker
30: slider
60: latch mechanism
19A, 19B, 19C, 19D, or 19E: latch hole
32: slider hole
61: support portion
70: latch projection
69: movable portion
W2-W4: clearance in the direction of the central axial line
321: first inner surface of the slider hole 32
322: second inner surface of the slider hole 32
100: shock absorbing member 61M: one end of the support portion in the direction of central axial line
A1: first amount of space (clearance)
61N: the other end of the support portion in the direction of central axial line
A2: second amount of space (clearance)
191: first inner surface of the latch hole
192: second inner surface of the latch hole
W1: first distance
W2: second distance
71: base portion
72: intermediate portion
73: tip end portion
731: first outer surface of the tip end portion 73
732: second outer surface of the tip end portion 73
W3: third distance
711: first outer surface of the base portion 71
712: second outer surface of the base portion 71
W4: fourth distance
103: surrounding portion
101 or 102: pair of resilient portions
101A, 101B, 102A, or 102B: respective ends of resilient portions
101C or 102C: intermediate portion of the resilient portions

The invention claimed is:

1. A vehicle seat reclining device configured to be attached to a vehicle body and to cooperate with a locking device affixed to a tiltable backrest of a vehicle seat for locking tilted positions of the backrest stepwise, the vehicle seat reclining device comprising:
   a rail extending along a central axial line, the rail being affixable to the vehicle body so as to be one of at least substantially tangent to and coaxial with a path traced in space by the locking device as the backrest tilts;
   a slider slidably supported on the rail;
   a striker affixed to the slider and configured to engage with the locking device; and
   a latch mechanism provided between the rail and the slider and configured to selectively permit or prevent sliding of the slider relative to the rail, the latch mechanism including:
      a plurality of latch holes defined in the rail along the central axial line,
      a slider hole penetrating through the slider and configured to be alignable with the respective latch holes,
      a support portion provided on the slider, and
      a movable portion displaceably supported by the support portion and having a latch projection that is engageable with the respective latch holes while passing through the slider hole,
   wherein a clearance is defined in the direction of the central axial line between the slider hole and the latch projection, and
   one or more shock absorbing members is disposed on a first inner surface on a first side of the slider hole in the direction of the central axial line and on a second inner surface on a second side of the slider hole in the direction of the central axial line, the second side being opposite of the first side, and the one or more shock absorbing members being resiliently deformed by, and in sliding contact with, the latch projection.

2. The vehicle seat reclining device according to claim 1, wherein:
   a first amount of space is provided in the direction of the central axial line between the movable portion and a first end of the support portion on the first side in the direction of the central axial line,
   a second amount of space is provided in the direction of the central axial line between the movable portion and a second end of the support portion on the second side in the direction of the central axial line, and
   the first amount of space and the second amount of space have lengths that do not become zero even when the one or more shock absorbing members are fully resiliently deformed between the latch projection and either the first inner surface of the slider hole or the second inner surface of the slider hole.

3. The vehicle seat reclining device according to claim 2, wherein:
   a first inner surface on the first side of each latch hole in the direction of the central axial line and a second inner surface on the second side of each latch hole in the direction of the central axial line extend in parallel to the direction in which the latch holes penetrate through the rail,
   the first and seconds inner surfaces of each latch hole are spaced apart by a first distance,
   the first and second inner surfaces of the slider hole extend in parallel to the direction in which the slider hole penetrates through the slider,
   the first and second inner surfaces of the slider hole are spaced apart by a second distance that is larger than the first distance,
   the latch projection includes, in sequence, a base portion, an intermediate portion, and a tip end portion,
   a first outer surface on the first side of the tip end portion in the direction of the central axial line and a second outer surface on the second side of the tip end portion in the direction of the central axial line extend in parallel to the direction in which the latch holes penetrate through the rail,
   the first and second outer surfaces of the tip end portion are spaced apart by a third distance that is less than the first distance,
   a first outer surface on the first side of the base portion in the direction of the central axial line and a second outer surface on the second side of the base portion in the direction of the central axial line extend in parallel to the direction in which the slider hole penetrates through the slider,
   the first and second outer surfaces of the base portion are spaced apart by a fourth distance that is larger than the first distance but is less than the second distance,
   the intermediate portion continues from the first outer surface of the tip end portion to the first outer surface of the base portion and continues from the second outer surface of the tip end portion to the second outer surface of the base portion, and
   the intermediate portion has a shape that tapers in a direction from the base portion to the tip end portion.

4. The vehicle seat reclining device according to claim 1, wherein the one or more shock absorbing members are comprised of spring steel.

5. The vehicle seat reclining device according to claim 4, wherein the one or more shock absorbing members include:
   a surrounding portion affixed to the slider and surrounding the slider hole, and
   a pair of resilient portions that bend from the surrounding portion and respectively protrude between the first inner surface of the slider hole and the latch projection and between the second inner surface of the slider hole and the latch projection.

6. The vehicle seat reclining device according to claim 5, wherein each of the resilient portions:
   extends in a direction orthogonal to the direction of the central axial line and orthogonal to the direction in which the slider hole penetrates through the slider,
   continues to the surrounding portion at both ends thereof, and
   has an intermediate portion that curves or bends so as to be closer to the latch projection than the ends of the resilient portion.

7. The vehicle seat reclining device according to claim 6, wherein the support portion and the surrounding portion are joined to the slider.

8. The vehicle seat reclining device according to claim 7, wherein:
   a first amount of space is provided in the direction of the central axial line between the movable portion and a first end of the support portion on the first side in the direction of the central axial line,
   a second amount of space is provided in the direction of the central axial line between the movable portion and a second end of the support portion on the second side in the direction of the central axial line, and
   the first amount of space and the second amount of space have lengths that do not become zero even when the one or more shock absorbing members are fully resiliently deformed between the latch projection and either the first inner surface of the slider hole or the second inner surface of the slider hole.

9. The vehicle seat reclining device according to claim 8, wherein:
   a first inner surface on the first side of each latch hole in the direction of the central axial line and a second inner surface on the second side of each latch hole in the direction of the central axial line extend in parallel to the direction in which the latch holes penetrate through the rail,
   the first and seconds inner surfaces of each latch hole are spaced apart by a first distance,
   the first and second inner surfaces of the slider hole extend in parallel to the direction in which the slider hole penetrates through the slider,
   the first and second inner surfaces of the slider hole are spaced apart by a second distance that is larger than the first distance,
   the latch projection includes, in sequence, a base portion, an intermediate portion, and a tip end portion,
   a first outer surface on the first side of the tip end portion in the direction of the central axial line and a second outer surface on the second side of the tip end portion in the direction of the central axial line extend in parallel to the direction in which the latch holes penetrate through the rail,
   the first and second outer surfaces of the tip end portion are spaced apart by a third distance that is less than the first distance,
   a first outer surface on the first side of the base portion in the direction of the central axial line and a second outer surface on the second side of the base portion in the direction of the central axial line extend in parallel to the direction in which the slider hole penetrates through the slider,
   the first and second outer surfaces of the base portion are spaced apart by a fourth distance that is larger than the first distance but is less than the second distance,
   the intermediate portion continues from the first outer surface of the tip end portion to the first outer surface of the base portion and continues from the second outer surface of the tip end portion to the second outer surface of the base portion, and
   the intermediate portion has a shape that tapers in a direction from the base portion to the tip end portion.

10. The vehicle seat reclining device according to claim 9, wherein the rail is straight.

11. The vehicle seat reclining device according to claim 5, wherein the support portion and the surrounding portion are joined to the slider.

12. An apparatus comprising:
    a rail defining a plurality of discrete latch holes disposed along a central axial line thereof, the rail being configured to be fixedly attached to a lateral side of a vehicle body,
    a slider supported on or in the rail so as to be selectively slidable along the central axial line, wherein a slider hole is defined in the slider so as to be alignable with the respective latch holes,
    a striker fixedly attached to the slider and configured to be engaged by a locking device affixed to a vehicle backrest,
    at least one latch comprising a support fixedly attached to the slider and a lever coupled to the latch support so as to be pivotable about an axis parallel to the central axial line, the lever having a latch projection that extends through the slider hole and is selectively engageable with the respective latch holes, wherein engagement of the latch projection with at least one latch hole prevents the slider from sliding along the central axial line,
    a first spring disposed along a first inner surface of the slider hole and being in sliding contact with a first side of the latch projection, and
    a second spring disposed along a second inner surface of the slider hole and being in sliding contact with a second side of the latch projection, which opposite of the first side in the direction of the central axial line,
    wherein the second inner surface of the slider hole extends parallel to the first inner surface of the slider hole, and
    each of the first and second springs is always in a state of being at least partially resiliently deformed by the latch projection.

13. The apparatus according to claim 12, wherein the first and second springs are comprised of spring steel.

14. The apparatus according to claim 13, wherein the first and second springs are leaf springs.

15. The apparatus according to claim 14, wherein:
    a first amount of space is provided in the direction of the central axial line between the lever and a first edge of the support,
    a second amount of space is provided between the lever and a second edge of the support,
    the first amount of space is wider in the direction of the central axial line than the first leaf spring in its fully compressed state, and
    the second amount of space is wider in the direction of the central axial line than the second leaf spring in its fully compressed state.

16. The apparatus according to claim 15, wherein:
    the latch projection includes a base portion, an intermediate portion and a tip portion, each of the latch holes has a greater width in the direction of the central axial line than the tip portion, the intermediate portion tapers in a direction extending towards the tip portion, at least one segment of the intermediate portion has a greater width in the direction of the central axial line than each of the latch holes, and the at least one segment of the intermediate portion is configured to directly and firmly contact opposite edges of each latch hole in the direction of the central axial line when the tip portion is disposed within a particular latch hole.

17. The apparatus according to claim 16, wherein the first and second leaf springs are integrally connected with a surrounding portion that is affixed to the slider.

18. The apparatus according to claim 17, wherein the rail is straight.

19. The apparatus according to claim 12, wherein:

a first amount of space is provided in the direction of the central axial line between the lever and a first edge of the support, a second amount of space is provided between the lever and a second edge of the support, the first amount of space is wider in the direction of the central axial line than the first spring in its fully compressed state, and the second amount of space is wider in the direction of the central axial line than the second spring in its fully compressed state.

20. The apparatus according to claim 12, wherein:

the latch projection includes a base portion, an intermediate portion and a tip portion, each of the latch holes has a greater width in the direction of the central axial line than the tip portion, the intermediate portion tapers in a direction extending towards the tip portion, at least one segment of the intermediate portion has a greater width in the direction of the central axial line than each of the latch holes, and the at least one segment of the intermediate portion is configured to directly and firmly contact opposite edges of each latch hole in the direction of the central axial line when the tip portion is disposed within a particular latch hole.

* * * * *